Sept. 6, 1938. J. C. BUCHANAN 2,129,342
TRANSMISSION SYNCHRONIZER
Filed Sept. 11, 1936
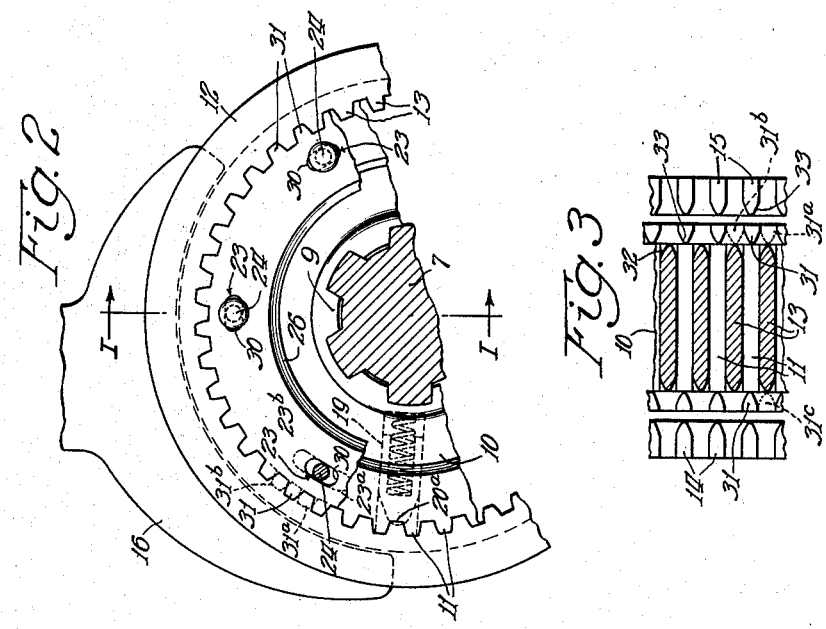
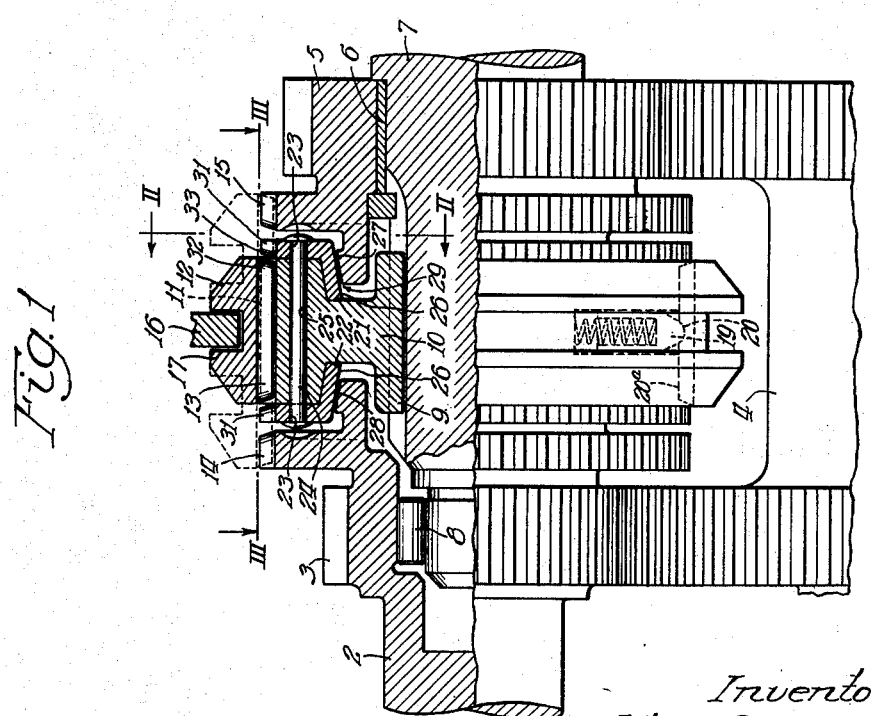
Inventor:
John C. Buchanan
By: Edward C. Fitzhaugh
Atty.

Patented Sept. 6, 1938

2,129,342

UNITED STATES PATENT OFFICE 2,129,342

TRANSMISSION SYNCHRONIZER

John C. Buchanan, Ypsilanti, Mich., assignor to Borg-Warner Corporation, Chicago, Ill., a corporation of Illinois Application September 11, 1936, Serial No. 100,237

2 Claims. (Cl. 192—53)

This invention relates to transmission synchronizers. The invention is concerned more particularly with synchronization of driving and driven transmission elements immediately prior to establishing positive drive therebetween in such manner that clashing of the interengaging positive drive clutch elements may be substantially avoided and their engagement may be effected with despatch.

It is an object of the invention to provide a synchronizing mechanism of such character as to prevent clashing of coupling parts under normal driving conditions.

It is also an object of the invention to provide a synchronizing structure which will insure against coupling action or engagement of clutch teeth prior to substantially complete synchronization of the parts to be coupled together.

A further object of the invention involves the provision of mechanism for speedily synchronizing relatively moving parts.

In accordance with the general features of the invention, there is provided a blocking element which assumes a position obstructing the coupling action upon approach of the relatively moving parts to be coupled under normal driving conditions, and ceases to so obstruct only when the parts are in substantial synchronism.

Upon exertion of the shifting force under normal driving conditions, clashing of teeth in a device embodying the present invention will not occur. On the other hand, there are times, as when making an emergency shift in traffic, for example, when in the interest of safety and of making a quick shift, it is possible with this invention for the driver to forcibly thrust the shiftable clutch member into the clutching engagement by application of excessive pressure even with some clashing, if in the short shifting time substantial synchronism has not been attained.

Other objects and advantages of the invention will appear as the description proceeds.

The invention will be best understood by reference to the following description of an embodiment thereof, shown in the accompanying drawing, wherein:

Fig. 1 is a longitudinal fragmentary view, partly in section and partly in elevation, of a transmission mechanism embodying the invention, taken as indicated by the line I—I in Fig. 2.

Fig. 2 is a fragmentary view, partly in section and partly in elevation, taken substantially as indicated by the line II—II in Fig. 1.

Fig. 3 is a fragmentary sectional plan view taken substantially as indicated by the line III—III in Fig. 1.

Referring now more particularly to the drawing, in which is illustrated a portion of a transmission such as may be found in automotive vehicles, in conjunction with marine engines, and in fact in any assembly for the transmission of power, there is shown a drive shaft 2 with its drive gear 3, a countershaft 4 and a gear 5 receiving torque from the drive shaft 2 through gears on the drive shaft and countershaft, the gear 5 being journaled on a bushing 6 about a driven shaft 7 journaled at 8 in the drive shaft 2. Splined at 9 to the driven shaft 7 intermediate the drive shaft 2 and the gear 5 is a clutch ring or hub 10 arranged to have slight longitudinal floating movement relative to the driven shaft 7. Slidably splined on the outer periphery of the ring 10 at 11 is a clutch collar 12 whose teeth 13 are adapted to be clutched with clutch teeth 14 on the drive shaft 2 to establish a driving connection between the drive shaft 2 and the driven shaft 7 through the clutch ring 10, and with clutch teeth 15 carried by the gear 5 to establish a reduced speed driving connection, through the ring 10, between the gear 5 and the driven shaft 7.

Suitably mounted on the frame (not shown) is a shift fork 16 of any suitable construction, adapted to be held yieldably in the desired positions of adjustment, and received in an appropriate groove 17 in the clutch collar 12 for shifting the same.

In synchronizing clutch structures heretofore in vogue, suitable gripping surfaces have been provided on the parts such as the parts 10 and 5, and relative sliding movement of the clutch collar 12 and the teeth 13 has been yieldably restrained by means such as a spring pressed poppet 19 normally projecting into a groove 20 in a tooth 13, until the gripping surfaces have established some degree of synchronization.

In practice, however, it has been found that even under normal conditions of driving the shifting force overcomes the restraint due to the spring before substantially complete synchronism and the clutch collar forges ahead and clashes with the part with which it is intended to be coupled.

In accordance with the present invention, these and other undesirable characteristics attendant upon the use of conventional synchronizing mechanisms have been obviated. To this end a blocking ring or blocker is secured to each side of the clutch hub 10, as shown at 21 and 22.

Each blocker is rotatably received in the ring 10 and is provided with one or more generally arcuately extending slots 23. A rivet or headed pin 24 extends through a bore 25 in the hub 10 and passes through said slots in the blockers and serves to retain the blockers in assembled relation to the clutch ring while permitting the relative rotation above referred to, each blocker being movable independently of the other blocker. The pins 24 serve to return each blocker axially with the ring 10 when the latter is returned to neutral position, thereby to prevent accidental drag of the blocker against the cooperating friction surface.

The number of pins and associated slots may be varied as desired. Preferably a plurality, equally angularly spaced, is provided. An assembly of this character including three or six, pins and associated slots may be satisfactory.

Each blocker has a frusto-conical friction surface 26 which may be formed directly upon the blocker element or upon an attached bronze or bronze composition ring affording the desired friction and wear-resistant characteristics. The surface 26 is frictionally engageable with a complemental frusto-conical friction surface 27 which may be formed on a part secured to or integral with the gear 5, or with a similar surface 28 similarly associated with the drive shaft 2. It will thus be evident, for example when it is desired to establish a drive indirectly from the drive shaft 2 to the driven shaft 7 through the gear 5, that the initial movement of the collar 12 to the right, as seen in Fig. 1, results in a take-up of the axial clearance normally existing at 29 between the surfaces 26 and 27 when the hub 10 is in neutral position. The take-up of this clearance is effected by the transmission of the shifting force from the collar 12 to the hub 10 by the engagement of the left wall of the recess 20 by the spring pressed plunger 19. This axial movement of the hub is terminated by engagement of the aforesaid surfaces 26 and 27.

Assuming, for illustration, that the shift is being made from low to second speed, it will be appreciated that at the inception of the shift, the car is in neutral and is moving under its own momentum, the drive shaft 2 being disconnected from the engine due to release of the engine clutch. The obstruction afforded by the friction surface 27, while preventing further sliding of the ring or hub 10, would not prevent continued movement of the collar 12, movement of the latter being merely yieldably resisted by the spring pressed poppet 19 in the groove 20. However, due to the frictional engagement at the surfaces 26 and 27, and the fact that the gear 5 and shaft 7 are moving at different speeds (the gear 5 moving faster than the shaft 7 but gradually slowing down due to friction following release of the engine clutch upon shift from low to neutral, preparatory to the shift to second speed, while the shaft 7 coasts or free wheels at substantially the same speed at which it was rotating in low), the surface 27 will apply a torque upon the blocker 21 and turn it relative to the hub 10 substantially to the relative position shown in dotted lines in Figs. 2 and 3, with the pins and slots 23 in one limit of their relative movement, the pins being then in engagement with the forward walls 30 of said slots.

It will be observed that each blocker is provided with a circumferential series of clutch teeth 31 of substantially the same pitch as the external teeth 11 on the hub 10. The arrangement of pins and slots is such that when the blocker is in the aforesaid limit of its movement relative to the hub 10, the teeth 31 thereof are staggered relative to the teeth 11 of the hub 10 so as to be positioned directly in the path of the internal teeth 13 of the collar 12 as shown in dotted lines at 31a. As long as the gear 5 rotates faster than the shaft 7, the torque applied to the friction ring or blocker 21 will maintain the teeth 31 where they obstruct the juxtaposed ends of the collar teeth 13 and thus substantially prevent movement of the collar 12 toward the teeth 15 of the gear 5.

It will be appreciated that the tendency of the gear 5 to slow down because of friction continues notwithstanding synchronization, so that immediately following the instant when synchronism is first attained, the surface 27 exerts upon the blocker 21 a torque which is opposite in direction to the torque previously applied thereto, with the result that the blocker is now shifted relative to the hub 10 toward the position shown in full lines, where the teeth 31 are in registration with the teeth 11 on the hub 10, where the teeth 31 do not interfere with engagement of the collar 12 with the teeth 15.

During this shift of the blocker 21, pressure is continuously applied from the collar 12, maintaining engagement between the juxtaposed chamfered tooth ends 32 and 33 of the teeth 13 and 31, respectively. Thus as the teeth 31 approach alignment with the teeth 11, the teeth 13 of the collar 12 move axially to the right and, when the alignment is complete, the collar 12 is unobstructed and may be moved directly into clutching engagement with the teeth 15 on the second speed gear 5. In the event of any disalignment between the teeth 13 and 15 at this point, under normal driving conditions no clashing will occur in view of the fact that at this point the relative rotation between the teeth is substantially nil and the interengagement is facilitated by reason of the camming effect resulting from engagement of the chamfered tooth ends 32 of the collar 12 with the chamfered ends 33 of the teeth 15. In this manner, the hub 10 and gear 5 are positively coupled together to establish second speed drive. When the collar 12 has reached this coupling position, shown dotted at the right in Fig. 1, pressure thereon by the shift lever is released, and thereafter the blocker 21 is controlled longitudinally relative to the collar 12 by the friction due to pressure of the poppet 19 on the straight edge portion 20a of the associated collar tooth 13. The amount of movement of the collar 12 to effect its proper engagement with the teeth 15 is such that when clutch engagement occurs the plunger 19 is still in engagement with a tooth of the collar 12.

When the parts are arranged as shown in full lines in Fig. 1, with the teeth 31 in their median or neutral position offering no obstruction to the movement of the collar 12, the spring pressed plunger 19 in the recess 20 prevents the collar 12 from accidentally moving longitudinally relative to the hub 10. When the collar 12 is initially moved toward the teeth 15, pressure is transmitted by a wall portion of the recess 20, engaging the poppet 19, to the friction surface 26, causing the latter to be engaged with the surface 27 to commence the synchronizing operation. After perfect synchronism is effected the teeth 31 are automatically fully registered with the grooves alternating with the collar teeth 13 and, at that time, the continued shifting pressure upon the collar 12 overcomes the pressure of the spring pressed poppet 19 and forces the latter out of the recess 20.

Consideration now will be given to the mode of operation of the invention insofar as the shift from a higher speed to second is concerned. Following release of the coupling between the high speed clutch teeth 14 and the collar 12, in the shift from high to second while proceeding along fairly level terrain or down hill, it will be evident that the main shaft 7 will be proceeding under the momentum of the vehicle at a higher speed than the second speed gear 5. Upon application of pressure to shift the collar 12 to the right as seen in Fig. 1, the torque by the surface 27 upon the blocker surface 26 will be in a direction opposite to that exerted when changing from low to second. Thus, relative to the hub 10, the teeth 31 will occupy the positions indicated by the dotted lines 31b in Figs. 2 and 3, preventing the collar 12 from moving into engagement with the teeth 15 until after synchronization has been reached and momentarily passed. After the initiation of the synchronizing force, the accelerator is operated, speeding up the gear 5, until it drifts or creeps momentarily faster than the shaft 7 to such an extent that the teeth 31 no longer obstruct the collar. Then the latter is free to shift longitudinally into engagement with the teeth 15. When the shift from high to second is to be made while the car is ascending a hill, the driven shaft 7, when the car is in neutral, rapidly slows down to and then below the speed of the gear 5, effecting first a blocking of the collar 12 and then allowing the collar to pass into clutched engagement with the teeth 15.

From the foregoing the synchronized shift from a lower speed to high will be readily understood. The initial movement of the high speed blocker 22 during this shift causes the drift of the blocker teeth forward to 31c. Immediately following synchronism these teeth drift reversely, to unblock the collar 12.

The tooth coupling occurs immediately following synchronization, before any substantial speed-difference occurs, so that under ordinary driving conditions the coupling is effected freely and substantially without clashing. The gearing may be of the helical or any other suitable type if desired.

In a construction embodying the invention, synchronism is effected so quickly that for practical purposes the entire shift of the coupling collar member may be regarded as substantially continuous.

The blockers may be conically telescoped with the hub 10 as shown, or otherwise relatively rotatably associated therewith within contemplation of the invention.

I am aware that many changes may be made and numerous details of construction may be varied through a wide range without departing from the principles of this invention, and I therefore do not purpose limiting the patent granted thereon otherwise than necessitated by the prior art.

I claim as my invention:

1. In a transmission synchronizer mechanism, a first torque transmitting element, a second torque transmitting element axially aligned with said first element, said first element having a plurality of radially and outwardly extending gear-like clutch teeth, a member adapted to rotate with said second element and having a plurality of radially and outwardly extending teeth adapted to align with said first-mentioned clutch teeth, a sleeve having a plurality of radially and inwardly extending clutch teeth slidably mounted on said member and adapted to be shifted longitudinally to bridge the teeth on said first element and said member to provide a positive two-way drive therebetween, a ring having a lost-motion rotary connection with said member and forming with said first element a friction clutch operable frictionally to transmit torque between said elements when the ring is urged in the direction of and into contact with said first element, said ring having a plurality of blocker members extending radially outwardly therefrom between said first element and said member and disposed, when the ring is rotated relative to said member in the path of movement of the toothed portion of said sleeve, thereby to block longitudinal movement of said sleeve in the direction of the clutch teeth on said first element, said members on said ring having inclined cam surfaces engageable with cooperating inclined cam surfaces on the toothed portion of said sleeve whereby the ring may yield to camming action between said surfaces as the tendency of the ring to rotate relative to said member diminishes during the synchronizing of said first and second elements through the instrumentality of said friction clutch, and means operable at will for imparting longitudinal movement to said sleeve.

2. In a transmission synchronizer mechanism, a first torque transmitting element, a second torque transmitting element axially aligned with said first element, said first element having a plurality of radially and outwardly extending gear-like clutch teeth, a member adapted to rotate with said second element and having a plurality of radially and outwardly extending teeth adapted to align with said first-mentioned clutch teeth, a sleeve having a plurality of radially and inwardly extending clutch teeth slidably mounted on said member and adapted to be shifted longitudinally to bridge the teeth on said first element and said member to provide a positive two-way drive therebetween, a ring having a lost-motion rotary connection with said member disposed between said first element and said member and forming with said first element a friction clutch operable frictionally to transmit torque between said elements when the ring is urged in the direction of and into contact with said first element, said ring having a plurality of blocker teeth, one for each of the alignable pairs of teeth on said first element and said member, and interposed therebetween, the adjacent ends of the teeth on said ring and on said sleeve being inclined to provide cooperating camming surfaces whereby simultaneously to resist longitudinal movement of the teeth on said sleeve in a direction toward the clutch teeth of said first element, when the sleeve is urged longitudinally toward said first element, until the teeth of said ring are brought into register with teeth on said member by relative reverse rotation of said ring, and means operable at will for imparting longitudinal movement to said sleeve.

JOHN C. BUCHANAN.